(12) United States Patent
Okohira (10) Patent No.: US 10,325,550 B2
(45) Date of Patent: Jun. 18, 2019

(54) ELECTRONIC MIRROR DEVICE (71) Applicant: Panasonic Intellectual Property Management Co., Ltd., Osaka (JP)

(72) Inventor: Takashi Okohira, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 15/327,374

(22) PCT Filed: Jul. 22, 2015

(86) PCT No.: PCT/JP2015/003665
§ 371 (c)(1),
(2) Date: Jan. 18, 2017

(87) PCT Pub. No.: WO2016/017114
PCT Pub. Date: Feb. 4, 2016

(65) Prior Publication Data
US 2017/0140699 A1 May 18, 2017

(30) Foreign Application Priority Data
Jul. 31, 2014 (JP) .................................. 2014-155799

(51) Int. Cl.
*B60K 35/00* (2006.01)
*B60R 1/02* (2006.01)
(Continued)

(52) U.S. Cl.
CPC .......... *G09G 3/2096* (2013.01); *B60K 35/00* (2013.01); *B60R 1/00* (2013.01); *B60R 1/02* (2013.01);
(Continued)

(58) Field of Classification Search
CPC ................................. B60K 35/00; B60R 1/02
See application file for complete search history.

(56) References Cited

U.S. PATENT DOCUMENTS

| | | | | |
|---|---|---|---|---|
| 2008/0252833 | A1* | 10/2008 | Nieuwkerk | B60R 1/088 349/115 |
| 2014/0121899 | A1* | 5/2014 | Sung | B60R 1/00 701/36 |
| 2015/0277203 | A1* | 10/2015 | VanderPloeg | B60R 1/088 349/113 |

FOREIGN PATENT DOCUMENTS

| | | |
|---|---|---|
| CN | 106163873 A | 11/2016 |
| JP | 11-291817 | 10/1999 |

(Continued)

OTHER PUBLICATIONS

The Extended European Search Report dated Jun. 12, 2017 for the related European Patent Application No. 15826521.5.
(Continued)

*Primary Examiner* — Jeffery A Williams
(74) *Attorney, Agent, or Firm* — Greenblum & Bernstein, P.L.C.

(57) ABSTRACT

The electronic mirror device includes a display and a controller. The display includes a body case, an image display unit, and a light control filter, and is mounted on an installation position of a rear-view mirror in an interior of a vehicle for displaying an image captured by a camera mounted to the vehicle. The body case has an opening, and the image display unit is mounted to the opening of the body case. The light control filter is disposed to face a display surface of the image display unit. The light control filter can switch between at least two modes including a light reflecting mode and a light transmitting mode based on supply of electricity. The controller controls the image display unit and the light control filter.

4 Claims, 7 Drawing Sheets

(51) Int. Cl.
   *G09G 3/20*   (2006.01)
   *B60R 1/00*   (2006.01)
   *B60R 1/04*   (2006.01)
   *G02B 27/01*  (2006.01)
   *H04N 7/18*   (2006.01)
   *B60R 1/12*   (2006.01)
   *G09G 3/36*   (2006.01)
   *H04N 5/232*  (2006.01)

(52) U.S. Cl.
   CPC .................. *B60R 1/04* (2013.01); *B60R 1/12* (2013.01); *G02B 27/01* (2013.01); *G09G 3/36* (2013.01); *H04N 5/23293* (2013.01); *H04N 7/18* (2013.01); *H04N 7/183* (2013.01); *B60K 2350/106* (2013.01); *B60K 2350/2013* (2013.01); *B60K 2350/2021* (2013.01); *B60K 2350/2078* (2013.01); *B60K 2350/352* (2013.01); *B60K 2350/927* (2013.01); *B60R 2001/1253* (2013.01); *B60R 2300/8066* (2013.01); *G09G 2360/144* (2013.01)

(56) References Cited

FOREIGN PATENT DOCUMENTS

| | | |
|---|---|---|
| JP | 2002-225629 | 8/2002 |
| JP | 2004-021025 | 1/2004 |
| JP | 2005-335410 A | 12/2005 |
| JP | 2009-506928 | 2/2009 |
| JP | 2010-105419 | 5/2010 |
| WO | 2007/029137 A1 | 3/2007 |

OTHER PUBLICATIONS

International Search Report of PCT application No. PCT/JP2015/003665 dated Sep. 15, 2015.

English Translation of Chinese Search Report dated Aug. 1, 2018 for the related Chinese Patent Application No. 201580040267.6.

* cited by examiner

ELECTRONIC MIRROR DEVICE

TECHNICAL FIELD

The present invention relates to an electronic mirror device that presents an image, which is captured by a camera mounted to a vehicle, to a driver.

BACKGROUND ART

A conventional electronic mirror device displays an image, which is captured by a camera mounted to a vehicle, on a display device installed on an installation position of a rear-view mirror in the interior of the vehicle. The display device includes a body case having an opening on the side of a driver seat, and a display attached to the body case. The display includes a half mirror provided such that a display surface thereof is directed to the side of the driver seat, and an image display unit provided to the half mirror on the side opposite to the side of the driver seat (for example, see Patent Literature 1 as a prior art similar to this configuration).

CITATION LIST

Patent Literature

PTL 1: Unexamined Japanese Patent Publication No. H11-291817

SUMMARY OF THE INVENTION

The present invention provides an electronic mirror device including a display having high visibility.

The electronic mirror device according to the present invention includes a display and a controller. The display includes a body case, an image display unit, and a light control filter, and is mounted on an installation position of a rear-view mirror in an interior of a vehicle for displaying an image captured by a camera mounted to the vehicle. The body case has an opening, and the image display unit is mounted to the opening of the body case. The light control filter is disposed to face a display surface of the image display unit. The light control filter can switch between at least two modes including a light reflecting mode and a light transmitting mode based on supply of electricity. The controller controls the image display unit and the light control filter.

According to the present invention, the light control filter switches between at least two modes including the light reflecting mode and the light transmitting mode based on supply of electricity, and the controller controls the image display unit and the light control filter. According to this configuration, the present invention can improve both the visibility when a driver confirms a rear view by an image captured by the camera and the visibility when the driver confirms a rear view by a reflection surface of the light control filter in the light reflecting mode.

DESCRIPTION OF EMBODIMENTS

Prior to the description of the exemplary embodiments of the present invention, a problem of a conventional electronic mirror device will be briefly described. In the conventional example described above, in the case an image captured by the camera is displayed on the display, the image display unit displays the image. In the case an image captured by the camera is not displayed, the power supply to the image display unit is turned off, and a driver confirms a rear view by a reflection image of the half mirror.

However, in the state in which the driver confirms the rear view by the image captured by the camera, the driver confirms the image through the half mirror, which provides low visibility as compared to the case where the driver directly sees the image display unit.

In addition, in the state in which the driver confirms the rear view by the half mirror, the half mirror provides only a half of reflection light to the driver, which leads to low visibility as compared to the case where the driver confirms the rear view from the entire reflection light.

The case where the electronic mirror device according to the exemplary embodiments of the present invention is mounted to a vehicle will be described with reference to the drawings.

First Exemplary Embodiment

Figure 1:
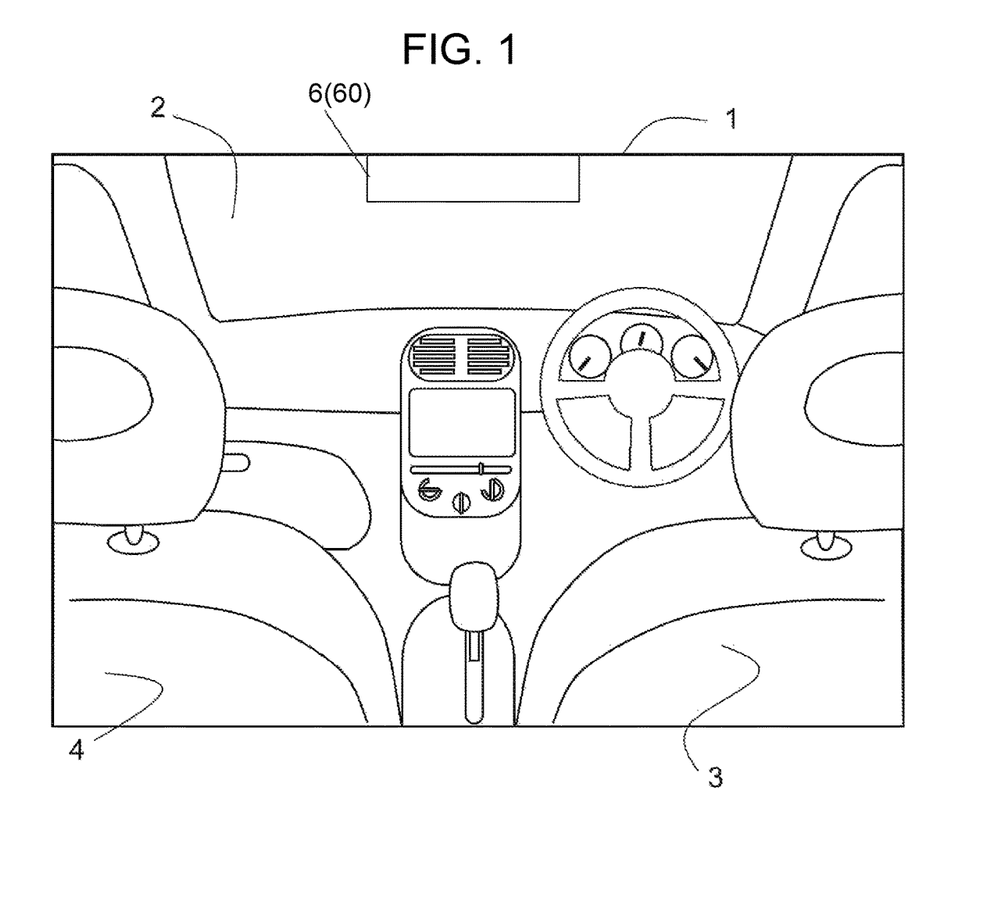
FIG. 1 is a front view of a vehicle interior of an automobile including an electronic mirror device according to a first exemplary embodiment of the present invention.
Figure 2:
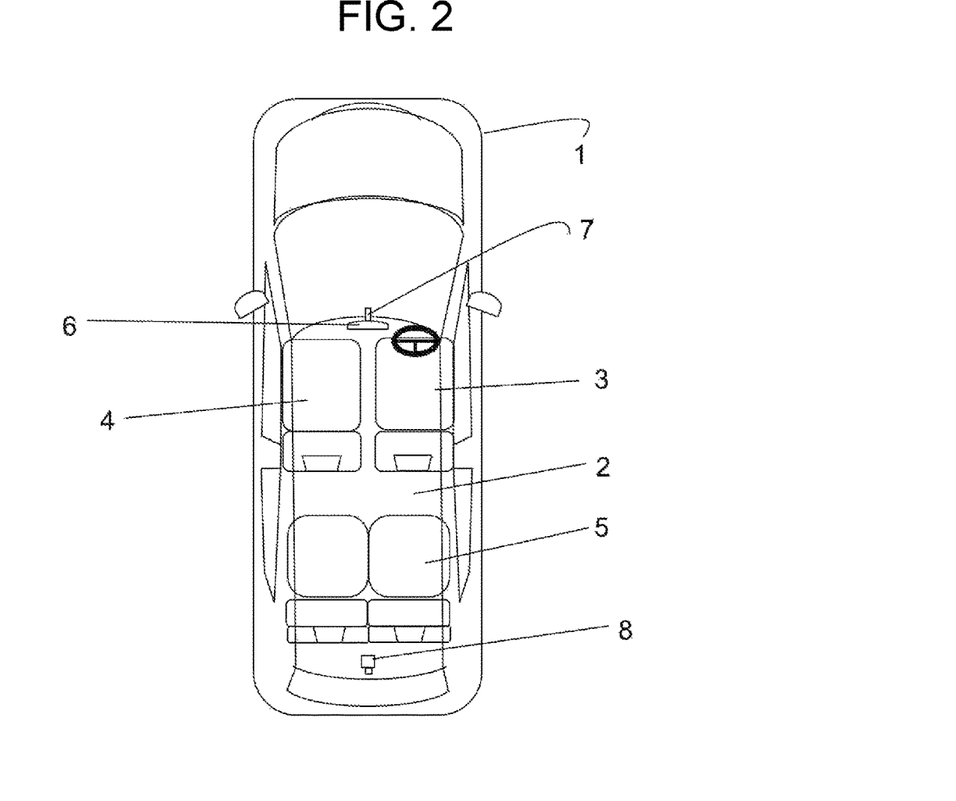
FIG. 2 is a top view of the automobile illustrated in FIG. 1.
Figure 3:
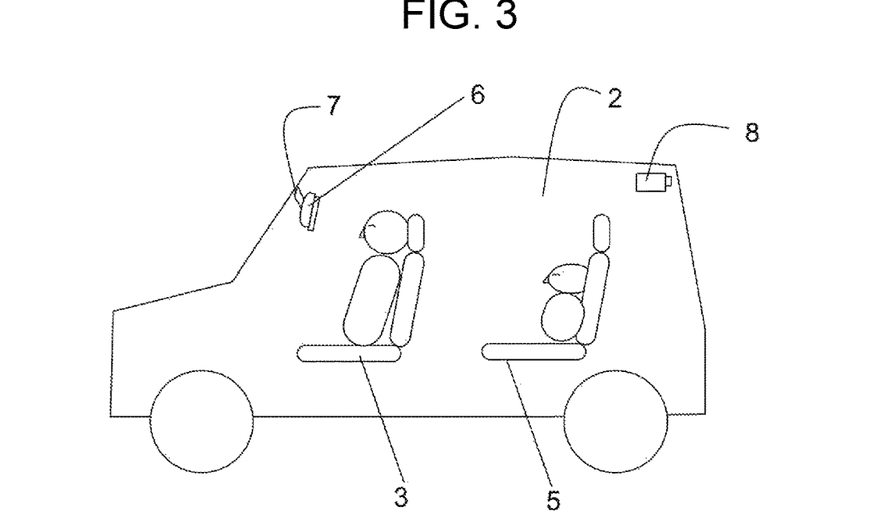
FIG. 3 is a schematic view of the interior of the automobile illustrated in FIG. 1 viewed from side.
Figure 4:
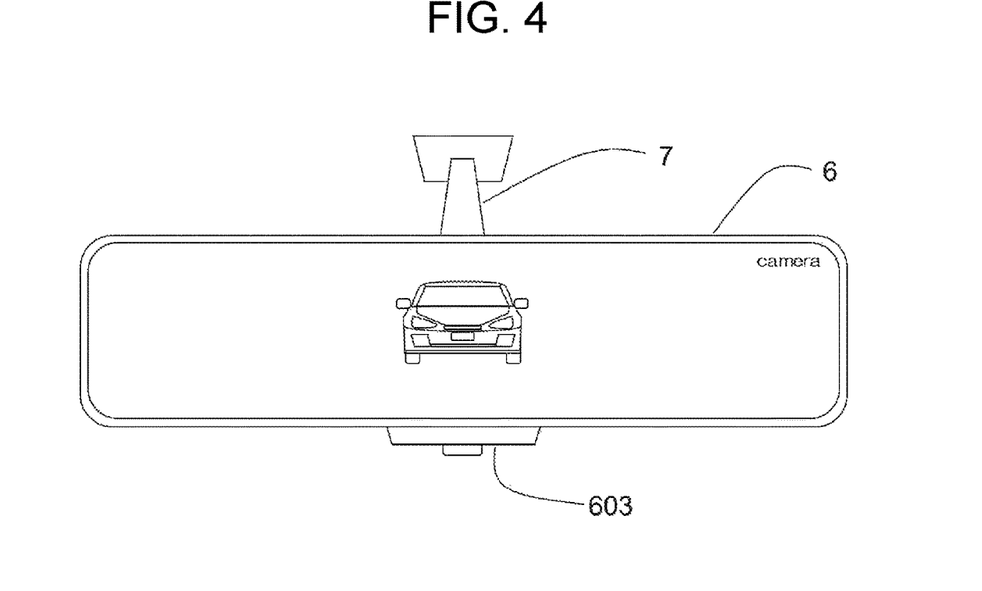
FIG. 4 is a front view of a display of the electronic mirror device illustrated in FIG. 1.
Figure 5:
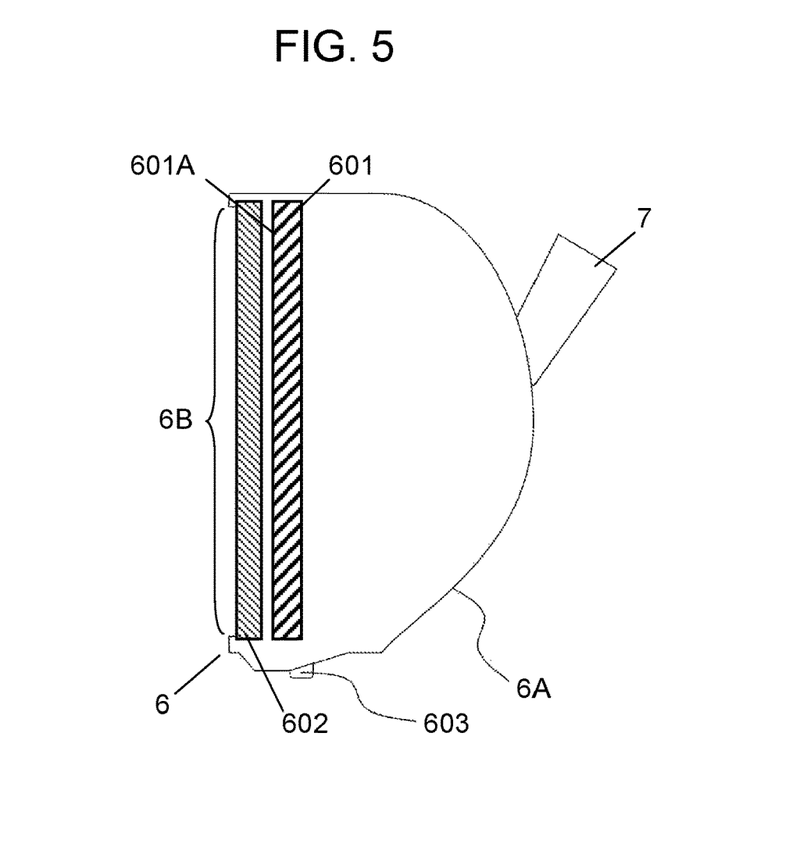
FIG. 5 is a sectional view of the display illustrated in FIG. 4.
Figure 6:
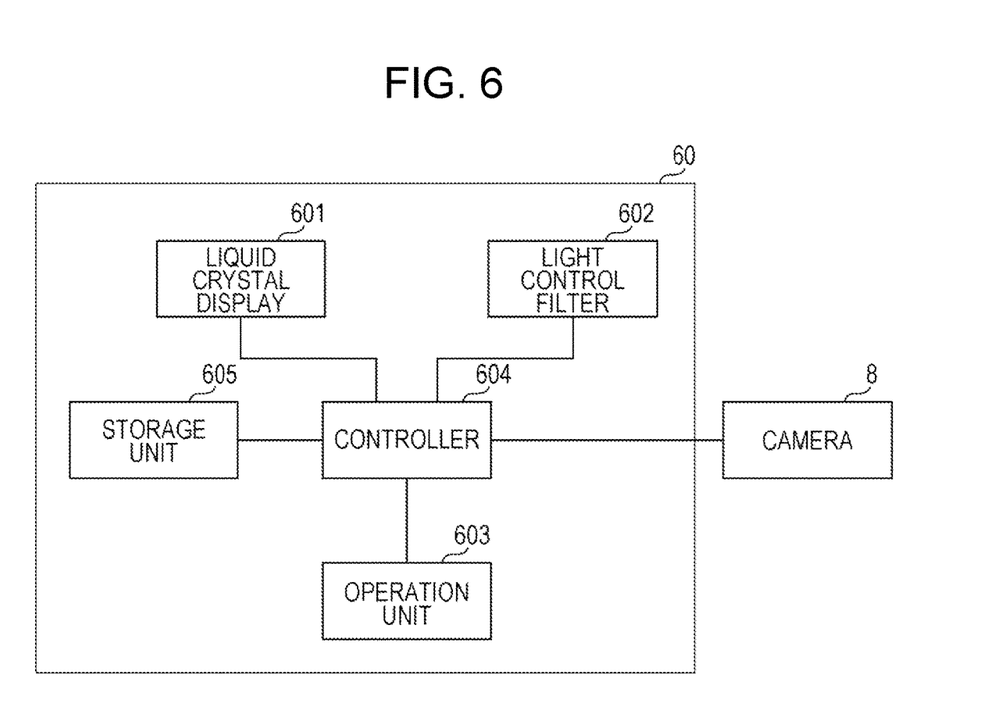
FIG. 6 is a control block diagram of the electronic mirror device according to the first exemplary embodiment of the present invention.

FIG. 1 is a front view of vehicle interior 2 of automobile 1 including electronic mirror device 60 according to a first exemplary embodiment of the present invention. FIG. 2 is a top view of automobile 1, and FIG. 3 is a schematic view of the interior of automobile 1 viewed from side. FIG. 4 is a front view of display 6 in electronic mirror device 60, and FIG. 5 is a sectional view of display 6 illustrated in FIG. 5. FIG. 6 is a control block diagram of electronic mirror device 60.

Driver seat 3 and passenger seat 4 are provided on the front part of vehicle interior 2 of automobile 1, and backseat 5 is provided on the rear part of vehicle interior 2. In addition, display 6 constituting electronic mirror device 60 is mounted on an installation position of a rear-view mirror in front of the portion between driver seat 3 and passenger seat 4, so as to be adjustable with respect to mounting portion 7. That is, electronic mirror device 60 is disposed in front of driver seat 3. In addition, camera 8 that captures an image of a rear view of automobile 1 is mounted behind backseat 5 in vehicle interior 2.

As illustrated in FIG. 4, display 6 can switch the display on display 6 between a display of an image by liquid crystal display 601 serving as the image display unit illustrated in FIG. 5 and a display by light control filter 602 serving as a mirror according to the operation of operation unit 603.

As illustrated in FIG. 5, display 6 has body case 6A, liquid crystal display 601 serving as the image display unit, light control filter 602, and operation unit 603. Body case 6A has opening 6B which is open toward driver seat 3. Liquid crystal display 601 is mounted to opening 6B such that display surface 601A is directed to driver seat 3, and stored in body case 6A. Liquid crystal display 601 displays an image captured by camera 8. Light control filter 602 is mounted on a position closer to driver seat 3 than liquid crystal display 601. That is, light control filter 602 is disposed to face display surface 601A of liquid crystal display 601. Operation unit 603 receives on-off (ON-OFF) operation of liquid crystal display 601 by the driver or the like.

Light control filter 602 can variably control the transmittance and reflectance thereof based on the supply of electricity, and shows at least two modes, a light reflecting mode and a light transmitting mode. It is to be noted that a light control filter showing two modes, a light reflecting mode and a light transmitting mode, as described above has been disclosed in Unexamined Japanese Patent Publication No. 2012-181389, for example, and the configuration, characteristics, and the like thereof will simplistically be described.

Liquid crystal display 601, light control filter 602, and operation unit 603 are connected to controller 604 as illustrated in FIG. 6. Storage unit 605 and camera 8 are also connected to controller 604. Storage unit 605 stores a control program, temporarily held data, control data, and the like by which controller 604 controls display 6 of electronic mirror device 60.

One example of the main operation of electronic mirror device 60 thus configured will be described.

Figure 7:
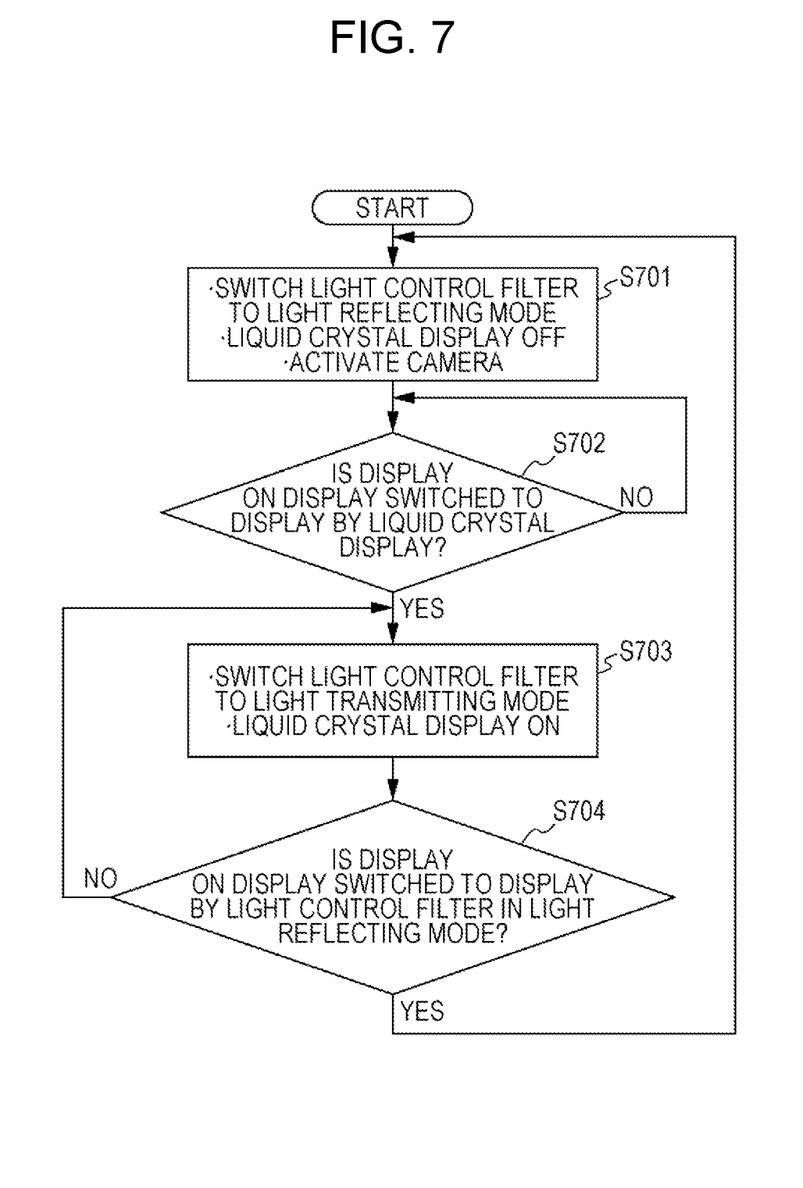
FIG. 7 is a flowchart illustrating one example of an operation of the electronic mirror device according to the first exemplary embodiment of the present invention.

FIG. 7 is a flowchart illustrating one example of the main operation of electronic mirror device 60.

When the process is started, controller 604 controls a power supply (not illustrated) fed to light control filter 602 so as to switch light control filter 602 to the light reflecting mode in which the reflectance is higher than 50%, to turn off liquid crystal display 601, and to activate camera 8 (step S701).

Preferably, after the process is started, controller 604 controls the power supply (not illustrated) fed to light control filter 602 so as to switch light control filter 602 to the light reflecting mode in which the reflectance is higher than 80%.

In this state, the driver can confirm the rear view by light control filter 602 as a mirror, because light control filter 602 is in the light reflecting mode. The reflectance of light control filter 602 is higher than the reflectance of 50% of a half mirror which has conventionally been used, and therefore, visibility higher than the visibility in the case the rear view is confirmed by the conventional half mirror can be achieved.

Controller 604 determines whether or not the display on display 6 is switched to the display by liquid crystal display 601 through the operation of operation unit 603 (step S702). When the switching operation is not performed, controller 604 repeats this determination until the switching operation is performed (NO in step S702).

When the display on display 6 is switched to the display by liquid crystal display 601 through the operation on operation unit 603 (YES in step S702), controller 604 controls the power supply (not illustrated) fed to light control filter 602, thereby switching light control filter 602 to the light transmitting mode in which the transmittance is higher than 50%, and turning on liquid crystal display 601 (step S703).

Preferably, when the display is switched to the display by liquid crystal display 601 (YES in step S702), controller 604 controls the power supply (not illustrated) fed to light control filter 602 so as to switch light control filter 602 to the light transmitting mode in which the transmittance is higher than 80%.

In this state, the driver can confirm the rear view by an image which is captured by the camera and is displayed on liquid crystal display 601 through light control filter 602. The transmittance of light control filter 602 is higher than the transmittance of 50% of the conventional half mirror, so that visibility higher than that of the conventional one can be achieved.

Controller 604 determines whether or not the display on display 6 is switched to the display by light control filter 602 in the light reflecting mode (as a mirror) through the operation of operation unit 603 (step S704). When the switching operation is not performed, controller 604 repeats this determination until the switching operation is performed (NO in step S704).

When the display on display 6 is switched to the display by light control filter 602 in the light reflecting mode (as a mirror) (YES in step S702), controller 604 proceeds to the process in step S701. Controller 604 executes the process in FIG. 7 until the power supply of electronic mirror device 60 is turned off.

As described above, according to electronic mirror device 60 in the present exemplary embodiment, light control filter 602 that shows at least two modes, the light reflecting mode and the light transmitting mode, based on the supply of electricity is mounted to liquid crystal display 601 on the side of driver seat 3, and controller 604 controls the light transmitting state (light reflectance and light transmittance) of liquid crystal display 601 and light control filter 602. Controller 604 causes the light transmittance of light control filter 602 to be higher than 50% under the condition in which liquid crystal display 601 is in the on state. In addition, controller 604 causes the light reflectance of light control filter 602 to be higher than 50% under the condition in which liquid crystal display 601 is in the off state.

According to this control, the improvement in visibility of liquid crystal display 601 is enabled. Furthermore, the visibility in the case light control filter 602 is used as a mirror can be improved by switching light control filter 602 to the light reflecting mode. That is, the visibility in the case the rear view is confirmed by liquid crystal display 601 and the visibility in the case the rear view is confirmed by the mirror function of light control filter 602 can both be improved.

In the above exemplary embodiment, liquid crystal display 601 is turned off in the case light control filter 602 is switched to the light reflecting mode to allow the rear view to be confirmed by the mirror function of light control filter 602. On the other hand, the reflectance of light control filter 602 may be adjusted according to the ambient environment, in the case the rear view is confirmed by the mirror function of light control filter 602. In addition, the configuration in which liquid crystal display 601 is driven even when the rear view is confirmed by the mirror function of light control filter 602 may be applied.

In the case the rear view is confirmed by using light control filter 602 as a mirror, it is preferable for the confirmation of the rear view by the mirror that the light control filter 602 has entirely a silver reflection surface. However, depending on conditions, it had sometimes better that the light control filter 602 does not entirely have a silver reflection surface.

For example, if light control filter 602 has entirely a silver reflection surface, such light control filter 602 may cause glare. In that case, the light reflectance of light control filter 602 is slightly reduced. In this case, light control filter 602 is in the state in which a small hole is present in the reflection surface on the entire surface, and according to this configuration, the light reflectance as a mirror is reduced, whereby glare can be suppressed. It is assumed that the driver feels glare if light control filter 602 is irradiated with high-intensity light (for example, light from a headlight of a following vehicle). That is, the light reflectance of light control filter 602 had better be slightly reduced when light control filter 602 is irradiated with high-intensity light from behind the vehicle. Specifically, in the case it is determined that the luminance of an image captured by camera 8 becomes equal to or higher than a certain threshold, the voltage to be applied to light control filter 602 is controlled to reduce the light reflectance of light control filter 602. The reduction in the light reflectance of light control filter 602 suppresses the glare felt by the driver. Alternatively, the light reflectance of light control filter 602 may be increased or decreased according to an increase or decrease in the luminance of an image captured by camera 8. In this case, liquid crystal display 601 is in the off state, so that the image captured by camera 8 is not displayed on liquid crystal display 601.

In addition, if it is configured such that, in the state in which a small hole is present as described above, liquid crystal display 601 located on the back surface side of light control filter 602 displays a light blue color, for example, blue light leaks from the small hole toward the front surface side (the side of driver seat 3) of light control filter 602, and thus, the reflection image on light control filter 602 which is in the light reflecting mode can be made slightly blue-tinged. This configuration can also suppress the glare to the driver.

Figure 8:
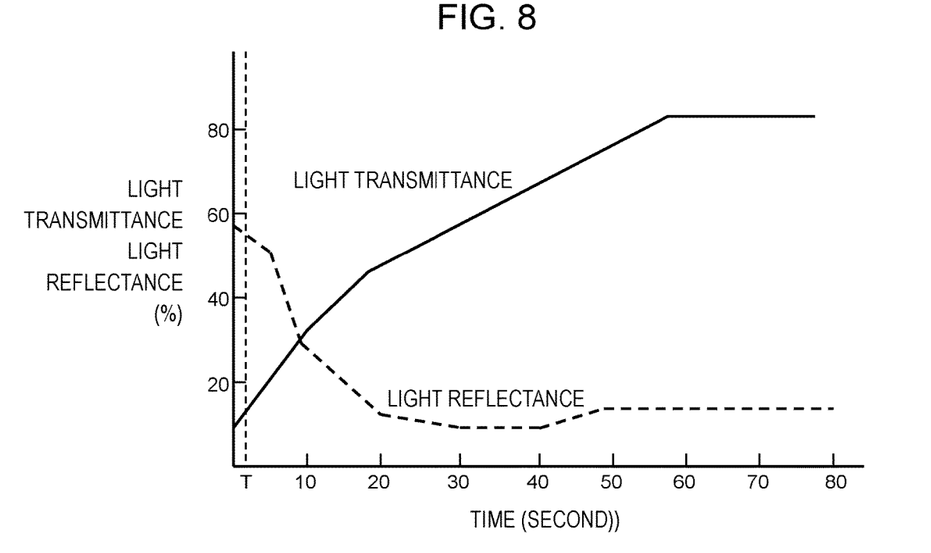
FIG. 8 is a characteristic chart of a light control filter used in the electronic mirror device according to the first exemplary embodiment of the present invention.

FIG. 8 is a graph illustrating the change in the light reflectance and light transmittance when light control filter 602 used in electronic mirror device 60 is switched to the light reflecting mode from the light transmitting mode. The horizontal axis indicates an elapsed time (second) after the application of voltage to light control filter 602 is stopped, and the vertical axis indicates the light reflectance or light transmittance of light control filter 602. As illustrated in FIG. 8, after the application of voltage to light control filter 602 is stopped, the light transmittance is gradually increased, while the light reflectance is gradually decreased. The point just after the application of voltage is stopped is a transition time at which light control filter 602 is switched to the light transmitting mode from the light reflecting mode. It is understood that it takes about 20 seconds until the light transmittance reaches 50%. Thereafter, the light reflectance and light transmittance are stabilized with time.

Time T in FIG. 8 shows the timing at which liquid crystal display 601 is switched to the on state from the off state. The light reflectance is still high just after the application of voltage to light control filter 602 is stopped. Therefore, if liquid crystal display 601 is turned on with this state, there may be the case in which a double image of an image displayed on liquid crystal display 601 and a reflection image of light control filter 602 is visible. In view of this, it is preferable that liquid crystal display 601 is turned on with a certain period of time after the application of voltage to light control filter 602 is stopped. Note that T is set as 2 seconds in the present exemplary embodiment.

It should be noted that, upon switching light control filter 602 to light transmitting mode, a very small voltage may be applied, in place of completely stopping the application of voltage to light control filter 602. In this case as well, it is preferable that, upon switching light control filter 602 to the light transmitting mode from the light reflecting mode, liquid crystal display 601 is turned on with a certain period of time after the value of the voltage to be applied to light control filter 602 is changed.

On the other hand, the case in which light control filter 602 is switched to light reflecting mode from the light transmitting mode will be considered. It is understood from FIG. 8 that the light reflectance of light control filter 602 keeps about 10% even after the application of voltage to light control filter 602 is stopped and the value of the light reflectance is stabilized. Light control filter 602 in this state has insufficient light reflectance, but is usable as a mirror for a short time. Therefore, in switching light control filter 602 to the light reflecting mode from the light transmitting mode, liquid crystal display 601 may be switched from the on state to the off state simultaneously with the start of the application of voltage to light control filter 602. If liquid crystal display 601 keeps in the on state even after the start of the application of voltage to light control filter 602, there may be the case in which a double image of an image displayed on liquid crystal display 601 and a reflection image of light control filter 602 is visible with the increase in the reflectance of light control filter 602.

However, in the case the light reflectance of light control filter 602 in the light transmitting mode is extremely small, it is preferable that liquid crystal display 601 is switched to the off state from the on state with a certain period of time after the start of the application of voltage to light control filter 602. This is because, if liquid crystal display 601 is turned off in the state in which the light reflectance of light control filter 602 is extremely small, the driver can confirm the rear view from neither liquid crystal display 601 nor light control filter 602.

Modification of First Exemplary Embodiment

Figure 9:
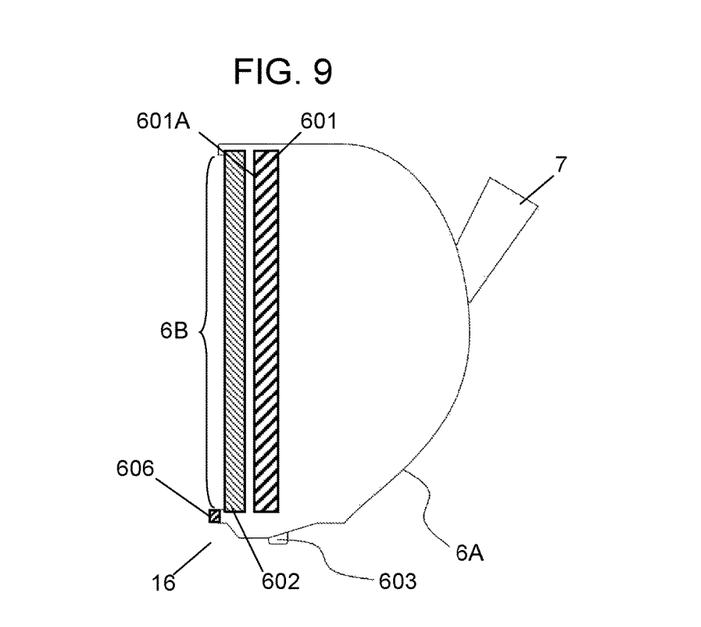
FIG. 9 is a sectional view of a display in an electronic mirror device according to a modification of the first exemplary embodiment of the present invention.
Figure 10:
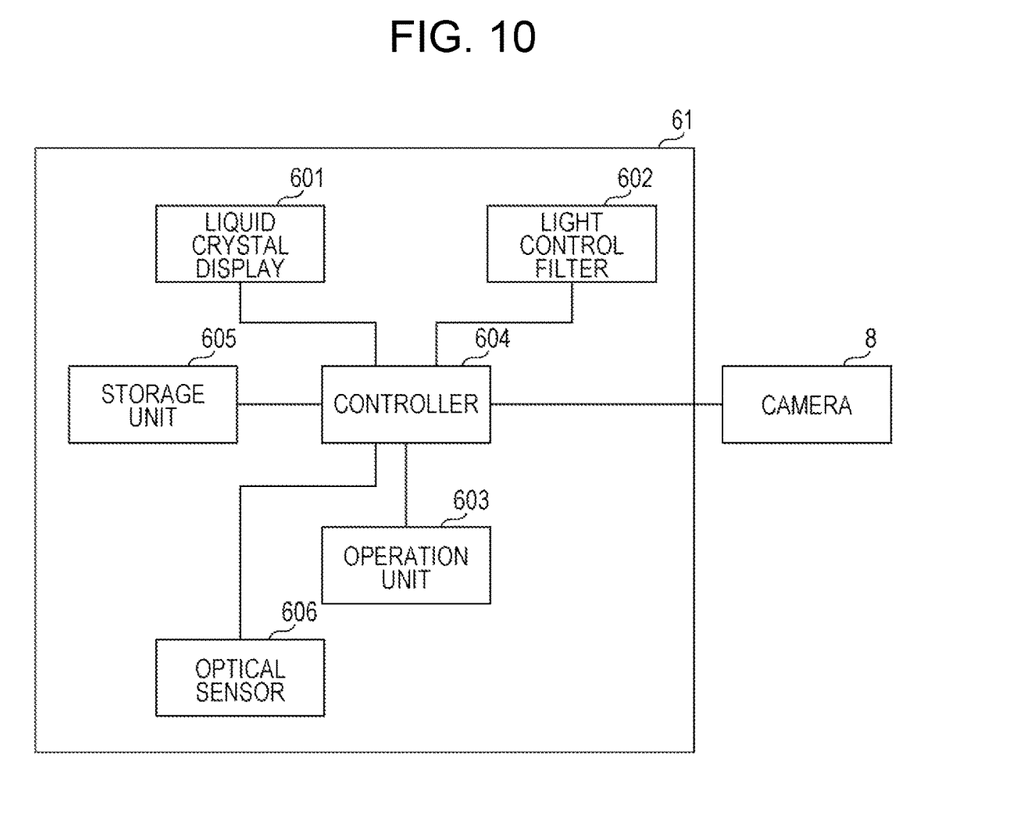
FIG. 10 is a control block diagram of the electronic mirror device according to the modification of the first exemplary embodiment of the present invention.

FIG. 9 is a sectional view of display 16 according to the modification of the first exemplary embodiment. The components similar to those in the first exemplary embodiment are identified by the same reference marks, and the description thereof will be omitted. The difference between the present modification and the first exemplary embodiment is that optical sensor 606 is provided to body case 6A. Optical sensor 606 measures illuminance of light radiated to light control filter 602. FIG. 10 is a control block diagram of electronic mirror device 61 according to the present modification. The output of optical sensor 606 is input to controller 604. The operation in the present modification will be described below.

Electronic mirror device 61 is activated when light control filter 602 is switched to the light reflecting mode and is used as a mirror to confirm a rear view. As described above, if light control filter 602 is irradiated with high-intensity light (for example, light from a headlight of a following vehicle) when being in the light reflecting mode, a driver sometimes feels glare. In view of this, in the present modification, the reflectance of light control filter 602 is controlled on the basis of the illuminance of light measured by optical sensor 606 in order to suppress glare felt by the driver.

Specifically, when light control filter 602 is in the light reflecting mode, controller 604 monitors the illuminance of light radiated to light control filter 602 on the basis of the output from optical sensor 606. When determining that the illuminance of light radiated to light control filter 602 becomes equal to or higher than a threshold, controller 604 controls the voltage to be applied to light control filter 602 to reduce the light reflectance of light control filter 602. The reduction in the light reflectance of light control filter 602 suppresses the glare felt by the driver. Alternatively, the light reflectance of light control filter 602 may be increased or decreased according to an increase or decrease in the output from optical sensor 606.

The present modification is particularly effective to be applied at night at which light from a headlight of a following vehicle is likely to be radiated. Therefore, the present modification may be applied only at night. Whether it is at night or not may be determined on the basis of a signal from optical sensor 606, or on the basis of an illumination source (ILL) signal that is output when a headlight of the vehicle is turned on.

It should be noted that liquid crystal display 601 and operation unit 603 may be eliminated from display 16, and further, display 16 may not be connected to camera 8. According to this configuration, light control filter 602 is always in the light reflecting mode and is used as a mirror to confirm a rear view. With this configuration as well, the glare felt by the driver can be suppressed by reducing the reflectance of light control filter 602 when light control filter 602 is irradiated with high-intensity light.

INDUSTRIAL APPLICABILITY

The electronic mirror is useful as a vehicle-mounted monitoring device.

REFERENCE MARKS IN THE DRAWINGS

1: automobile
2: vehicle interior
3: driver seat
4: passenger seat
5: backseat
6, 16: display
7: mounting portion
8: camera
6A: body case
6B: opening
60, 61: electronic mirror device
601: liquid crystal display
601A: display surface
602: light control filter
603: operation unit
604: controller
605: storage unit
606: optical sensor

What is claimed is:

1. A rearview mirror assembly comprising:
   a display configured to be mounted on an installation position of a rear-view mirror in a vehicle interior, the display, in operation, displays an image captured by a camera mounted to a vehicle, the display including:
     a body case having an opening;
     an image display unit having a display surface and mounted to the opening of the body case; and
     a light control filter disposed to face the display surface of the image display unit, the light control filter being switchable between at least two modes including a light reflecting mode and a light transmitting mode based on a supply of electricity; and
   a controller, which, in operation, controls the display, wherein
   in a case where the light control filter is in the light reflecting mode and the image display unit is in an off state, the controller determines whether or not an intensity of light of the image captured by the camera is equal to or higher than a preset threshold, and controls, in response to the intensity of light of the image captured by the camera being equal to or higher than the preset threshold, the light control filter to reduce light reflectance of the light control filter in the light reflecting mode.

2. The rearview mirror assembly according to claim 1, wherein
   the controller switches the light control filter to the light transmitting mode when the image captured by the camera is displayed on the image display unit, and switches the light control filter to the light reflecting mode when the image captured by the camera is not displayed on the image display unit.

3. The rearview mirror assembly according to claim 2, wherein
   when the image captured by the camera is not displayed on the image display unit, the controller switches the light control filter to the light reflecting mode, and drives the image display unit to allow a part of light from the image display unit to pass through the light control filter.

4. The rearview mirror assembly according to claim 2, wherein
   the controller switches the image display unit to a state of displaying the image captured by the camera from a state of not displaying the image captured by the camera after a predetermined time has elapsed from a point at which a state of the supply of electricity of the light control filter is changed.

* * * * *